US011436366B2

(12) United States Patent
Miron et al.

(10) Patent No.: US 11,436,366 B2
(45) Date of Patent: Sep. 6, 2022

(54) PARENTAL CONTROL SYSTEMS AND METHODS FOR DETECTING AN EXPOSURE OF CONFIDENTIAL INFORMATION

(71) Applicant: Bitdefender IPR Management Ltd., Nicosia (CY)

(72) Inventors: Adrian Miron, Buchare (RO); Viorel Zavoiu, Valea Adanca (RO); Cristian Ion, Iasi (RO); Cristian Minea, Iasi (RO); Liviu A. Holban, Buchare (RO); Bogdan Bugoiu, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 386 days.

(21) Appl. No.: 16/746,675

(22) Filed: Jan. 17, 2020

(65) Prior Publication Data
US 2020/0233974 A1 Jul. 23, 2020

Related U.S. Application Data

(60) Provisional application No. 62/794,856, filed on Jan. 21, 2019.

(51) Int. Cl.
*G06F 21/62* (2013.01)
*H04L 9/40* (2022.01)
(Continued)

(52) U.S. Cl.
CPC ........ *G06F 21/6245* (2013.01); *G06F 40/216* (2020.01); *G06Q 10/107* (2013.01);
(Continued)

(58) Field of Classification Search
CPC ..... G06F 21/6245; G06F 40/216; G06N 3/08; G06Q 10/107; H04W 4/12; H04L 51/12; H04L 51/14; H04L 63/20
See application file for complete search history.

(56) References Cited

U.S. PATENT DOCUMENTS

| 7,970,388 B2 | 6/2011 | Pfeffer |
| 8,331,618 B1 | 12/2012 | Yung et al. |

(Continued)

FOREIGN PATENT DOCUMENTS

| WO | 2015095597 A1 | 6/2015 |
| WO | 2018084854 A1 | 5/2018 |

OTHER PUBLICATIONS

Kurt Thomas et al., Data Breaches, Phishing, or Malware? Understanding the Risks of Stolen Credentials, Oct. 30, 2017, Association for Computing Machinery, New York, NY, USA, 1421-1434. DOI:https://doi.org/10.1145/3133956.3134067 (Year: 2017).*

(Continued)

*Primary Examiner* — Chau Le
(74) *Attorney, Agent, or Firm* — Law Office of Andrei D Popovici, PC

(57) ABSTRACT

Some embodiments use text and/or image processing methods to determine whether a child is transmitting confidential information to a conversation partner via an electronic messaging service. Some embodiments detect whether an image transmitted as part of an electronic message shows a bank card, a social security card, or an identity document, among others. When detecting such a situation, some embodiments automatically send a notification to a third party (e.g., parent, teacher, etc.)

15 Claims, 9 Drawing Sheets

(51) Int. Cl.
  *G06F 40/216* (2020.01)
  *G06Q 10/10* (2012.01)
  *H04W 4/12* (2009.01)
  *H04L 51/212* (2022.01)
  *H04L 51/214* (2022.01)

(52) U.S. Cl.
  CPC .......... *H04L 51/212* (2022.05); *H04L 51/214* (2022.05); *H04L 63/20* (2013.01); *H04W 4/12* (2013.01)

(56) References Cited

U.S. PATENT DOCUMENTS

| | | | |
|---|---|---|---|
| 8,490,176 | B2 | 7/2013 | Book et al. |
| 8,566,407 | B2 | 10/2013 | Lee et al. |
| 8,699,998 | B2 | 4/2014 | Sprigg et al. |
| 8,843,567 | B2 | 9/2014 | Kamik |
| 8,885,803 | B2 | 11/2014 | Kent, Jr. et al. |
| 9,088,861 | B2 | 7/2015 | Prakash et al. |
| 9,330,274 | B2 | 5/2016 | Schepis et al. |
| 2006/0036701 | A1 | 2/2006 | Bulfer et al. |
| 2008/0134282 | A1 | 6/2008 | Fridman et al. |
| 2008/0282338 | A1 | 11/2008 | Beer |
| 2009/0089417 | A1* | 4/2009 | Giffin ................... H04L 51/063 709/224 |
| 2010/0174813 | A1 | 7/2010 | Hildreth |
| 2012/0151047 | A1* | 6/2012 | Hodges ................. G06F 21/604 709/224 |
| 2015/0058242 | A1* | 2/2015 | Bucciarelli ............ H04W 4/16 705/325 |
| 2015/0317529 | A1* | 11/2015 | Zhou .................... G06V 30/224 382/190 |
| 2016/0034783 | A1* | 2/2016 | Cheng ....................... G06T 7/33 382/195 |
| 2016/0330084 | A1 | 11/2016 | Hunter et al. |
| 2017/0061248 | A1* | 3/2017 | Ryan, Jr. ............... H04W 12/02 |
| 2018/0068196 | A1* | 3/2018 | Quentin ............. G06Q 30/0601 |
| 2018/0152402 | A1 | 5/2018 | Tsou |
| 2020/0219082 | A1* | 7/2020 | Givol ..................... G06V 10/44 |

OTHER PUBLICATIONS

USPTO, Office Action dated Mar. 2, 2021 for U.S. Appl. No. 16/746,648, filed Jan. 17, 2020.
USPTO, Corrected Notice of Allowability dated Aug. 6, 2021 for U.S. Appl. No. 16/746,648, filed Jan. 17, 2020.
Amato et al., "Detection of Images with Adult Content for Parental Control on Mobile Devices", Proceedings of the 6th International Conference on Mobile Technology, Applications and Systems, Nice, France, Sep. 2009.
Bark, https://www.bark.us/, "Parental Control Phone Tracker App for iPhone and Android", downloaded from https://web.archive.org/web/20190118145606/https://www.bark.us/, Jan. 18, 2019.
Netnanny, https://www.netnanny.com, "Parental Control Software and Website Blocker", downloaded from https://web.archive.org/web/20190117151428/https://www.netnanny.com/, Jan. 17, 2019.
Mspy, https://www.mspy.com, "Cell Phone Tracker App", downloaded from https://web.archive.org/web/20190120043345/https://www.mspy.com/, Jan. 20, 2019.
The Spy Bubble, https://thespybubble.com/, "Cell Phone Monitoring Software", downloaded from https://web.archive.org/web/20180825134123/https://thespybubble.com/, Aug. 25, 2018.
Phone Sherrif, http://www.phonesheriff.com, "Parental Control Filtering Software for Mobile Phones and Tablets", downloaded from https://web.archive.org/web/20181217163555/http://phonesheriff.com/, Dec. 17, 2018.
Mama Bear App, https://mamabearapp.com/, "The All-in-One Worry-Free Parenting App", downloaded from https://web.archive.org/web/20181122030330/https://mamabearapp.com/, Nov. 22, 2018.
Teen Safe, https://teensafe.com/, "Cell Phone Monitoring for Iphone", downloaded from https://web.archive.org/web/20190119195444/https://teensafe.com/, Jan. 19, 2019.
Miron, U.S. Appl. No. 16/746,648, filed Jan. 17, 2020.
European Patent Office, International Search Report and Written Opinion dated Mar. 27, 2020 for PCT International Application No. PCT/EP2020/051292, international filing date Jan. 20, 2020, priority date Jan. 21, 2019.
European Patent Office, International Search Report and Written Opinion dated Mar. 27, 2020 for PCT International Application No. PCT/EP2020/051290, international filing date Jan. 20, 2020, priority date Jan. 21, 2019.
USPTO, Office Action dated Oct. 5, 2020 for U.S. Appl. No. 16/746,648, filed Jan. 17, 2020.

* cited by examiner

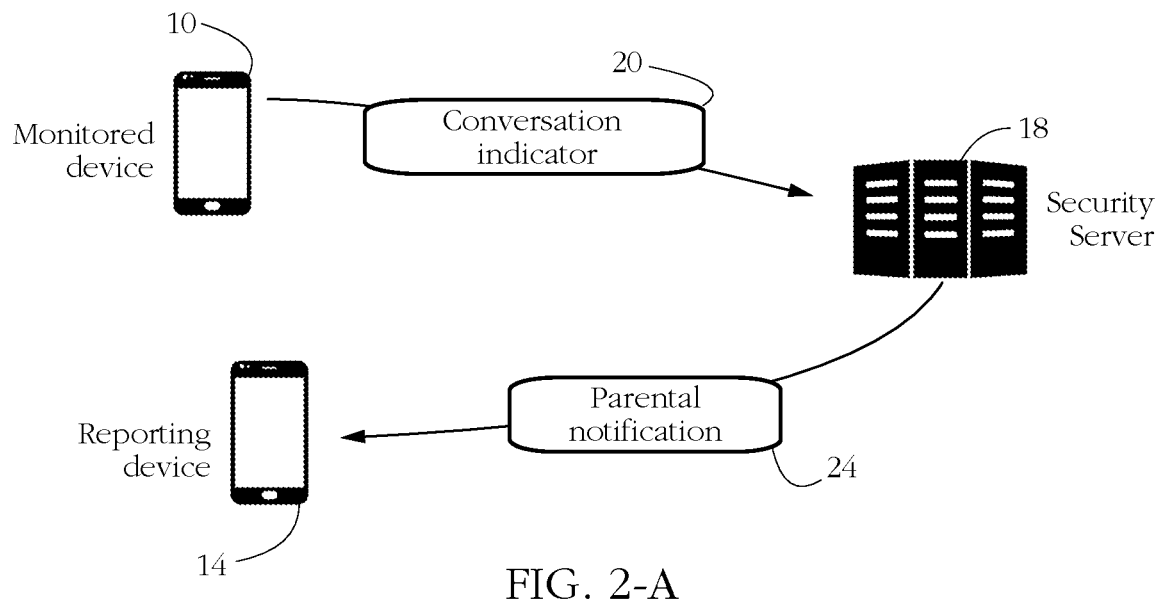
FIG. 2-A
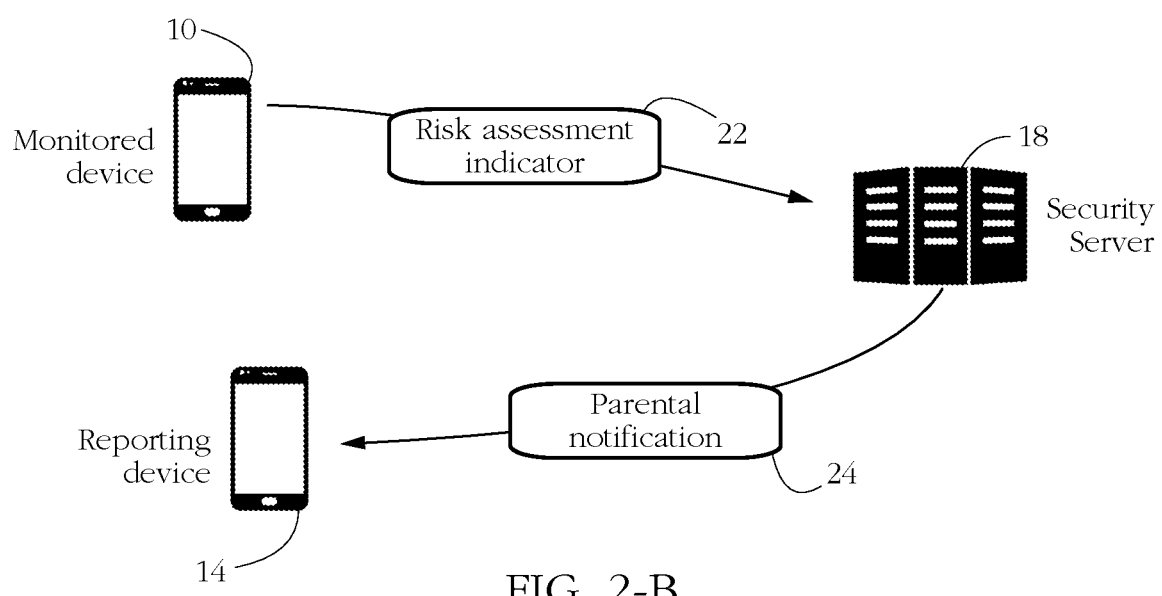
FIG. 2-B

PARENTAL CONTROL SYSTEMS AND METHODS FOR DETECTING AN EXPOSURE OF CONFIDENTIAL INFORMATION

RELATED APPLICATIONS

This application claims the benefit of the filing date of U.S. provisional patent application No. 62/794,856, filed on Jan. 21, 2019, entitled "Parental Control Systems and Methods," the entire contents of which are incorporated by reference herein.

BACKGROUND

The present invention relates to computer security, and in particular to systems and methods for protecting vulnerable Internet users (e.g., children) against online threats such as cyberbullying, online abuse, grooming, sexual exploitation, and theft of confidential information, among others.

Bullying is commonly defined as the activity of repeated, aggressive behavior intended to hurt another individual physically, mentally, or emotionally. Bullying behavior may manifest itself in various ways, such as verbally, physically, etc. When bullying occurs via modern means of communication such as electronic messaging and posting on social media, it is commonly referred to as cyberbullying. Successful bullying typically requires an imbalance of power and/or peer pressure, the weak side being at the receiving end of the abuse. Bullying is known to cause serious distress, even leading to suicide in some cases. Some social categories (children, young adults, members of a racial or sexual minority) may be more exposed to such threats than others.

With the explosive growth of the Internet, children and teens are spending a significant amount of time browsing and communicating online, at a point in their physical and emotional development where they are particularly vulnerable to threats such as bullying, sexual exploitation, and identity theft. The problem is amplified by the fact that the online culture of social media and instant messaging does not easily lend itself to supervision by traditional authority figures (parents, teachers, etc.), either because young users are often more technologically savvy than their guardians, or because the communication platforms themselves do not allow snooping.

In recent years, security software has been used successfully to protect computer users from computer threats such as malicious software (malware) and intrusion (hacking). There is currently substantial interest in developing software capable of protecting users against other emerging threats such as cyberbullying, grooming, sexual exploitation, and online harassment, ideally while preserving the privacy of their electronic messaging.

SUMMARY

According to one aspect, a parental control method comprises employing at least one hardware processor of a computer system to analyze an image transmitted as part of an electronic conversation between a minor and another party to determine whether the image shows a physical item selected from a group consisting of a bank card, a social security card, and an identity document. The method further comprises in response, when the image shows the physical item, employing the at least one hardware processor to transmit a parental notification to a parental reporting device identified from a plurality of devices according to the minor, the parental notification indicating that the minor has disclosed confidential information.

According to another aspect, a computer system comprises at least one hardware processor configured to execute an image processor and a parental notification dispatcher. The image processor is configured to analyze an image transmitted as part of an electronic conversation between a minor and another party to determine whether the image shows a physical item selected from a group consisting of a bank card, a social security card, and an identity document. The parental notification dispatcher is configured, in response to the image processor determining that the image shows the physical item, to transmit a parental notification to a parental reporting device identified from a plurality of devices according to the minor, the parental notification indicating that the minor has disclosed confidential information.

According to another aspect, a non-transitory computer-readable medium stores instructions which, when executed by at least one hardware processor of a computer system, cause the computer system to form an image processor and a parental notification dispatcher. The image processor is configured to analyze an image transmitted as part of an electronic conversation between a minor and another party to determine whether the image shows a physical item selected from a group consisting of a bank card, a social security card, and an identity document. The parental notification dispatcher is configured, in response to the image processor determining that the image shows the physical item, to transmit a parental notification to a parental reporting device identified from a plurality of devices according to the minor, the parental notification indicating that the minor has disclosed confidential information.

BRIEF DESCRIPTION OF THE DRAWINGS

The foregoing aspects and advantages of the present invention will become better understood upon reading the following detailed description and upon reference to the drawings where:

FIG. 2-A shows an exemplary data exchange between a monitored device, a security server, and a reporting device according to some embodiments of the present invention.

FIG. 2-B shows an alternative data exchange between the monitored device, security server, and reporting device according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise specified, any use of "OR" refers to a non-exclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A minor is a person under the age of to full legal responsibility. A computer program is a sequence of processor instructions carrying out a task. Computer programs described in some embodiments of the present invention may be stand-alone software entities or sub-entities (e.g., subroutines, libraries) of other computer programs. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
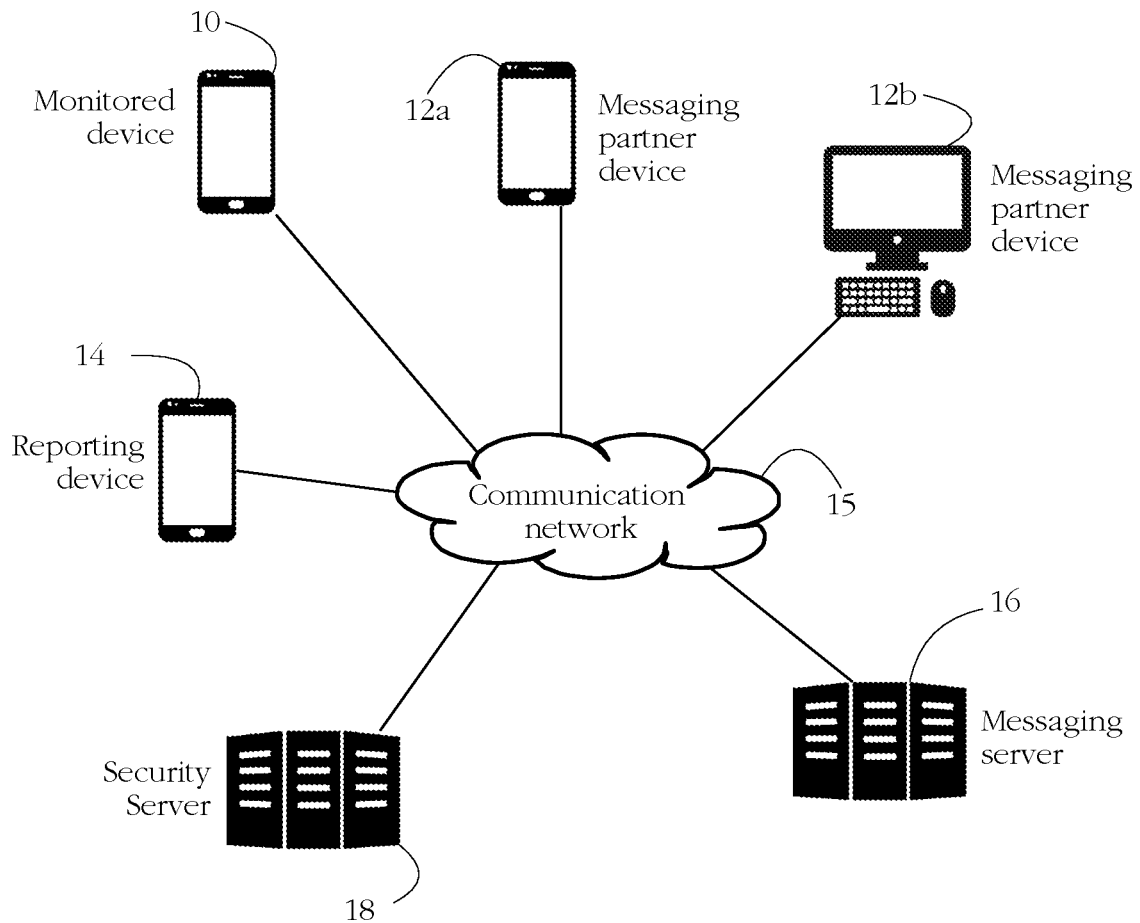
FIG. 1 illustrates an exemplary parental control system wherein a monitored device engaging in electronic messaging is protected against online threats according to some embodiments of the present invention.

FIG. 1 shows an exemplary parental control system protecting a user of a monitored device against online threats such as cyberbullying, sexual exploitation, and theft of confidential information, among others. In a typical scenario according to some embodiments of the present invention, the protected user (e.g., a minor) employs messaging software executing on a monitored device 10 (e.g., a smartphone) to exchange electronic messages with users of other messaging partner devices 12a-b. In some embodiments, security software executing on monitored device 10 and/or a remote security server 18 may be used to snoop on such conversations, typically without knowledge of the respective user. Conversations are then analyzed for content. When the security software determines according to the conversation content that the user is subject to an online threat, some embodiments transmit a notification to another party (e.g., parent, teacher, manager, etc.) via a reporting device 14 such as a smartphone or personal computer.

Monitored device 10 may comprise any electronic device having a processor and a memory, and capable of connecting to a communication network for exchanging electronic messages with messaging partner devices 12a-b. Exemplary monitored devices 10 include personal computers, laptop computers, tablet computers, smartphones, gaming consoles, virtual assistant devices, household appliances (e.g., smart TVs, media players, refrigerators), and wearable computer devices (e.g., smartwatches).

An electronic message comprises a communication transmitted between two electronic devices, the communication including at least an encoding of a text message between two human users of the respective devices. Electronic messaging is typically carried out using an instant messaging platform such as FACEBOOK® Messenger®, Instagram® Direct®, Snapchat®, WhatsApp®, etc., via electronic mail (email), and/or via a telephony messaging service such as short message service (SMS). Messaging platforms comprise software configured to enable a user to send and receive electronic messages to/from other users. Messages may vary in format according to the respective platform/service, but in general, an electronic message comprises an encoding of a text part and/or an encoding of a media file (e.g., image, movie, sound, etc.) The text part may comprise text written in a natural language (e.g., English, Chinese, etc.), and other alphanumeric and/or special characters such as emoticons, among others. In a typical configuration, messages are coordinated, centralized, and dispatched by a messaging server 16, in the sense that electronic messages between monitored device 10 and partner devices 12a-b are routed via server 16 (client-server protocol). In alternative embodiments, electronic messaging uses a de-centralized peer-to-peer network of connections between monitored devices and their respective messaging partner devices. Monitored device 10, messaging partner device(s) 12a-b and messaging server 16 are interconnected by a communication network 15 such as the Internet. Parts of network 15 may include a local area network (LAN), and a telecommunication network (e.g., mobile telephony).

Threat detection operations may be divided between monitored device 10 and security server 18 in various ways, as shown in detail below. Server 18 generically represents a set of interconnected computers which may or may not be in physical proximity to each other. FIGS. 2-A-B show exemplary data exchanges between monitored device 10 and security server 18 according to some embodiments of the present invention. In various embodiments, monitored device 10 may transmit conversation data (represented by conversation indicator 20 in FIG. 2-A) and/or threat-indicative information (represented by risk assessment indicator 22 in FIG. 2-B) to security server 18. At least a part of the conversation analysis/threat detection may then be carried out by components executing on security server 18. When the analysis indicates a potential threat to a user of monitored device 10, some embodiments of security server 18 send a parental notification 24 to a reporting device 14 (e.g., mobile telephone, personal computer, etc.) associated with the respective monitored device, thus informing a user of reporting device 14 about the respective threat. The term 'parental' is herein used only for simplicity and is not meant to be limiting in the sense that the receiver of the respective notification is necessarily a parent, or that the protected user is necessarily a child. Although typical applications of some embodiments are in parental control, a skilled artisan will understand that they can be adapted to monitoring and/or protecting other categories of users/devices. In child monitoring applications, notification 24 may be sent to a teacher, guardian, or any other person charged with supervising the respective child. In other exemplary applications directed at protecting employees against bullying and/or sexual harassment, notification 24 may be delivered to a manager, supervisor, or human resources staff, for instance. Exemplary formats and contents of notification 24 are shown further below.

Figure 3:
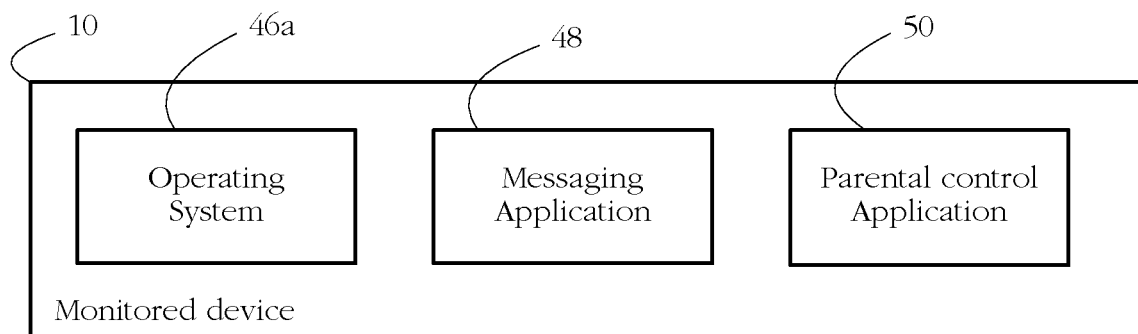
FIG. 3 shows exemplary software components executing on the monitored device according to some embodiments of the present invention.

FIG. 3 shows exemplary software components executing on monitored device 10 according to some embodiments of the present invention. Operating system 46a may comprise any widely available operating system such as Microsoft Windows®, MacOS®, Linux®, iOS®, or Android®, among others. OS 46a provides an interface between other computer programs (represented by applications 48 and 50) and hardware devices of monitored device 10.

Messaging application 48 generically represents any software configured to enable a user of device 10 to exchange electronic messages with other users. Exemplary messaging applications 48 include Yahoo® Messenger®, FACEBOOK®, Instagram®, and Snapchat® client applications, among others. Another exemplary messaging application 48 comprises an email client. Yet another exemplary messaging application 48 comprises software implementing a short message service (SMS) on a mobile telephone. Application 48 may display a content of each electronic message on an output device (e.g., screen) of monitored device 10 and may further organize messages according to sender, recipient, time, subject, or other criteria. Application 48 may further receive text input from a user of device 10 (e.g., from a keyboard, touchscreen, or dictation interface), formulate electronic messages according to the received text input, and transmit electronic messages to messaging server 16 and/or directly to messaging partner device(s) 12a-b. Message format and encoding may vary according to the messaging platform. Transmitting a message may comprise, for instance, adding an encoding of the respective message to an outbound queue of a communication interface of monitored device 10.

Figure 4:
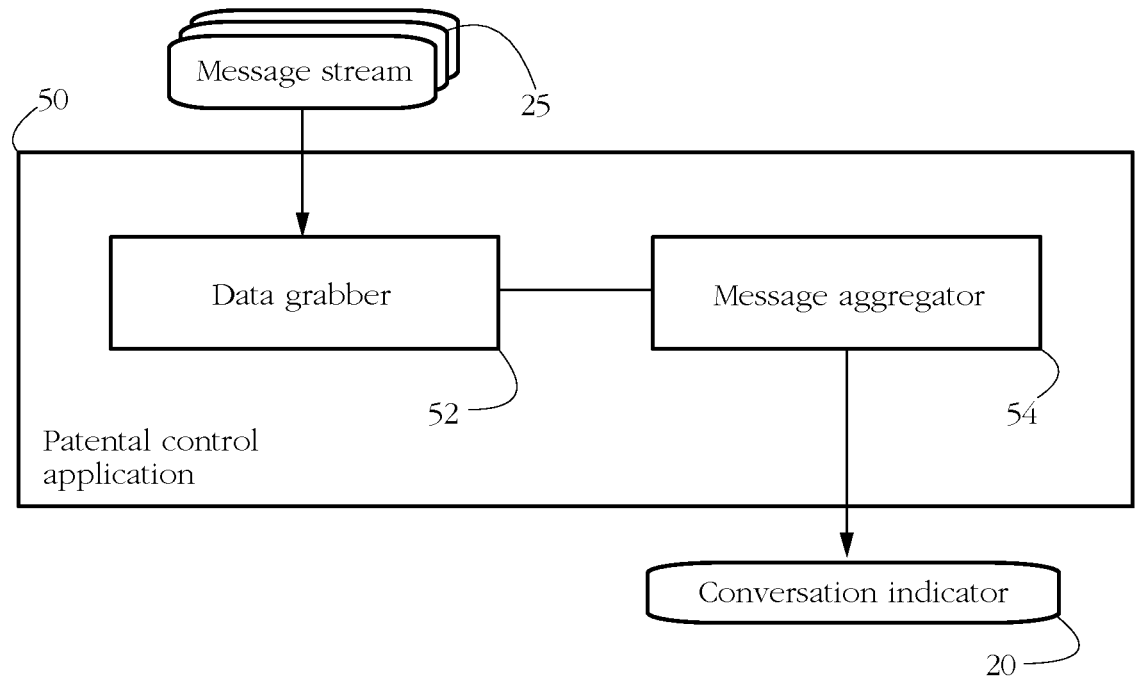
FIG. 4 illustrates the operation of an exemplary parental control application executing on the monitored device according to some embodiments of the present invention.

In some embodiments, parental control application 50 comprises software configured to access, harvest, and/or analyze a content of message exchanges between monitored device 10 and partner device(s) 12a-b. Parental control application 50 may be part of a larger computer security software suite comprising anti-malware and intrusion detection tools, among others. FIG. 4 shows exemplary components of parental control application 50 according to some embodiments of the present invention.

A data grabber 52 is configured to extract message content generated and/or received by messaging application 48. Extracting message content may comprise identifying individual electronic messages 25 of a message stream and determining message-specific features such as a sender and/or receiver, a time of transmission (e.g., timestamp), a text of the respective message, and possibly other content data such as an image attached to the respective message. Content extraction may proceed according to any method known in the art. In some embodiments, data grabber 52 surreptitiously modifies a component of messaging application 48 (for instance by hooking) to install a software agent that notifies data grabber when application 48 executes some specific operation such as receiving a communication or receiving user input, and enables data grabber 52 to extract message information. Some embodiments extract message content using built-in features of OS 46a such as an accessibility application programming interface (API). Accessibility APIs comprise software typically configured to grab information currently displayed on an output device (e.g., screen) of monitored device 10 for the purpose of making such information accessible to people with disabilities. One exemplary application of such accessibility APIs comprises translating on-screen text into audio (spoken text) to enable visually impaired people to use the computer. Some embodiments of data grabber 52 are configured to call specific accessibility API functions to parse data structures such as user interface trees while device 10 is displaying content generated by messaging application 48, and thus extract information such as message interlocutor names/aliases and a content of individual messages. Yet another embodiment of data grabber 52 may extract message content directly from intercepted network traffic going into messaging application 48 and/or passing via a network adapter(s) of monitored device 10. Such communication interceptors may implement communication protocols such as HTTP, Web Socket, and MQTT, among others, to parse communications and extract structured message data. When instant messages are encrypted, some embodiments employ techniques such as man-in-the-middle (MITM) to decrypt traffic for message content extraction.

Some embodiments of the present invention rely on the observation that threats such as bullying and sexual grooming typically involve complex social dynamics, and therefore are more accurately inferred from an extended conversation, as opposed to individual messages. In some embodiments therefore, a message aggregator 54 may aggregate individual messages into conversations consisting of multiple messages exchanged between the same pair of interlocutors (in the case of a one-to-one exchange), or within the same group (in the case of a group chat, for instance). Message aggregator 54 may collaborate with data grabber 52 to identify a sender and/or receiver of each intercepted message, organize a message stream into individual conversations, and output a conversation indicator 20. The operation of message aggregator 54 is further detailed below.

Figure 5:
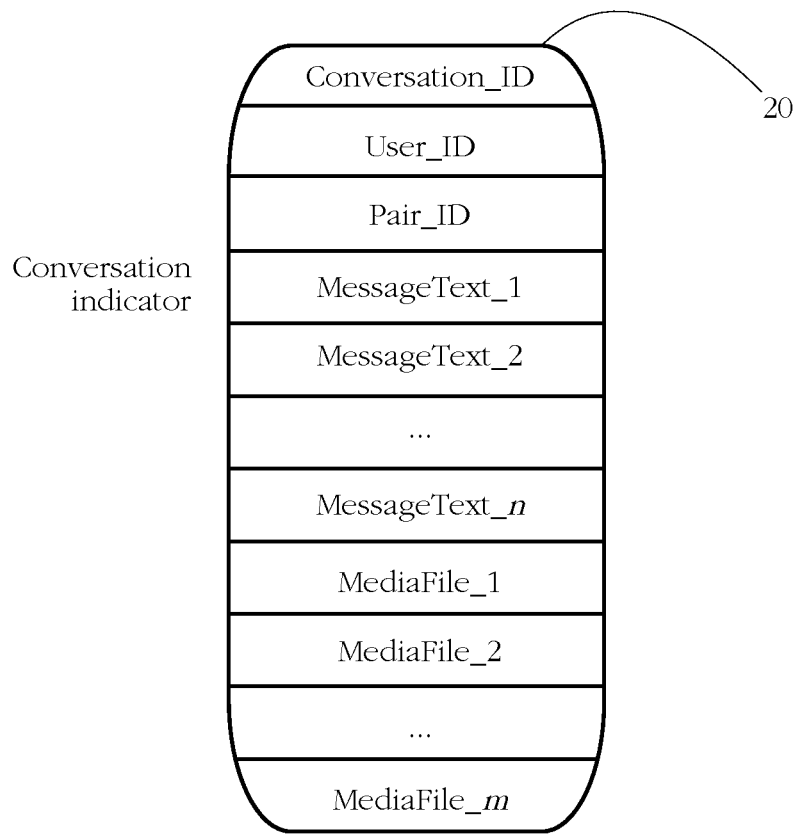
FIG. 5 illustrates an exemplary conversation indicator according to some embodiments of the present invention.

An exemplary conversation indicator 20 illustrated in FIG. 5 comprises a user ID identifying monitored device 10 and/or an individual user of the respective device, and a pair ID uniquely identifying a pair of interlocutors. In some embodiments, conversation indicator 20 further includes a plurality of message indicators Message_1 . . . Message_n, each corresponding to an individual message exchanged between the respective interlocutors. Individual message indicators may in turn include an identifier of a sender and/or of a receiver, a text content of each message (represented as MessageText_i in FIG. 5), and a timestamp indicating a moment in time when the respective message was sent and/or received. In an alternative embodiment, conversation indicator 20 comprises a concatenation of the text content of all messages in the respective conversation, individual messages arranged in the order of transmission according to their respective timestamp.

Conversation indicator 20 may further include a set of media indicators (represented as MediaFile_j in FIG. 5), for instance copies of image/video/audio files attached to messages belonging to the respective conversation, or a network address/URL where the respective media file is located. Other exemplary media indicators may include an indicator of a media format (encoding protocol), etc. A skilled artisan will understand that the actual data format for encoding conversation indicator 20 may differ among embodiments; exemplary formats include a version of an extensible markup language (XML), and Javascript Object Notation (JSON), among others.

Figure 6:
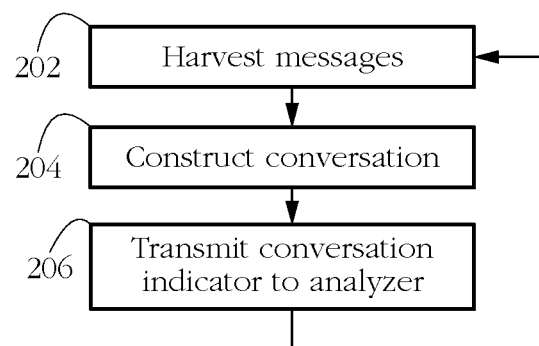
FIG. 6 shows an exemplary sequence of steps carried out by the parental control application according to some embodiments of the present invention.
Figure 7:
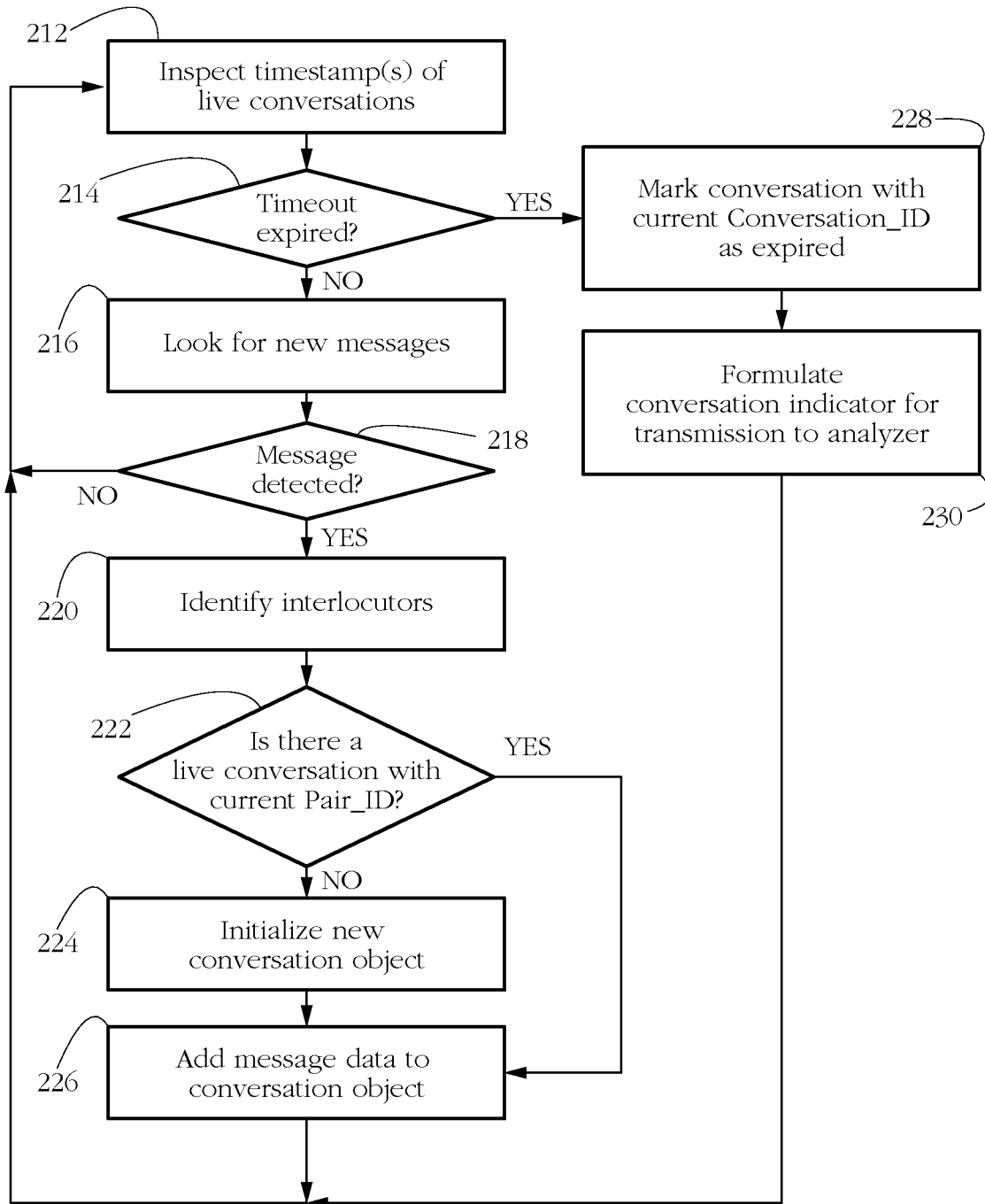
FIG. 7 shows an exemplary sequence of steps performed by message aggregator to construct a set of conversations according to some embodiments of the present invention.

FIG. 6 shows an exemplary sequence of steps performed by parental control application 50 according to some embodiments of the present invention. FIG. 7 further illustrates an exemplary algorithm for constructing conversations out of individual messages (step 204 in FIG. 6).

Parental control application 50 may represent each conversation as a separate data structure (e.g., an object with multiple data fields). Conversations may be defined according to various criteria, such as length (e.g., total count of messages, total word count) and/or time (e.g., messages exchanged in a pre-determined time interval). In some embodiments, a conversation is considered to be alive as long as its count of messages does not exceed a predetermined value; alternatively, a conversation may be considered alive as long as the time elapsed since its first message does not exceed a predetermined time threshold, and/or as long as a time elapsed since its latest message does not exceed another predetermined time threshold. Conversations which are no longer alive are herein deemed expired. In one example illustrated in FIG. 7, parental control application 50 monitors multiple live conversations, each conversation identified by a unique conversation ID. A step 212 determines an amount of time elapsed since the latest message of each live conversation. When said amount of time exceeds a pre-determined threshold (e.g., one hour), message aggregator 54 may consider the respective conversation closed/expired and remove it from the set of live conversations. A further step 230 may formulate conversation indicator 20 of the respective conversation and transmit the respective data away for further analysis. A similar flowchart may describe the operation of an alternative message aggregator that considers a conversation to be closed when the count of messages exceeds a pre-determined threshold (e.g., 500).

Meanwhile, data grabber 52 may listen for new messages (step 216). When a message is detected, a step 220 may identify the interlocutors of the respective message, for instance by parsing message data, or by analyzing the user interface of messaging application 48 (see above, in relation to using Accessibility APIs). When there is currently at least a live conversation with the respective interlocutors, in a step 226, aggregator 54 may add data characterizing the current message to a conversation object identified by the current interlocutors (e.g., pair ID). When there is currently no live conversation between the interlocutors of the current message, a step 224 may initialize a new conversation object identified by the current interlocutors/pair ID and may add message data to the newly initialized object. Application 50 may then return to listening for new messages and/or determining whether any live conversation has expired.

Figure 8:
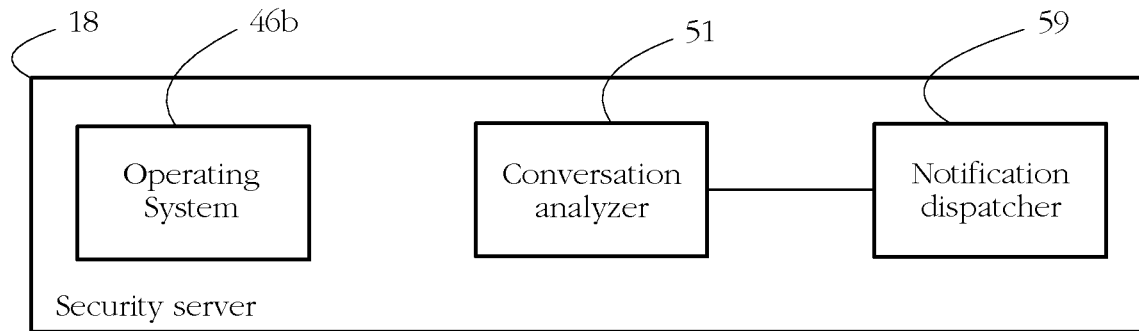
FIG. 8 shows exemplary software components executing on the security server according to some embodiments of the present invention.
Figure 9:
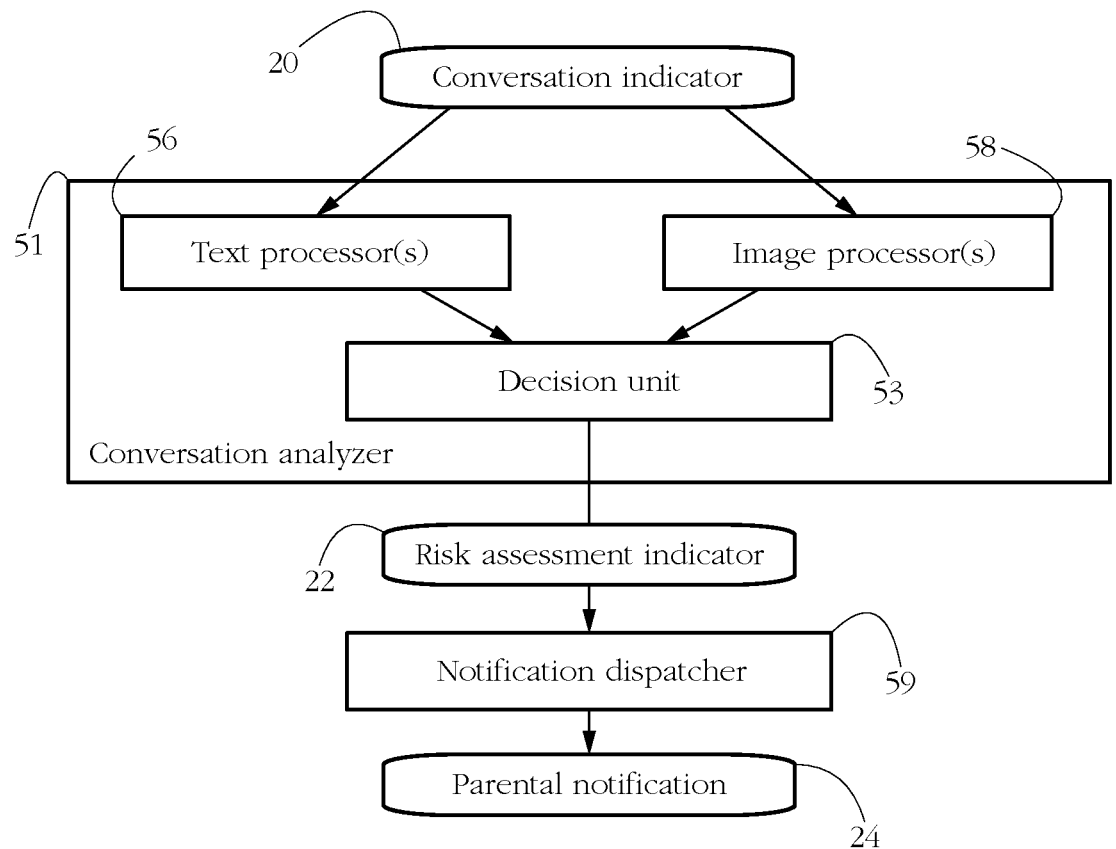
FIG. 9 shows an exemplary operation of the software components illustrated in FIG. 8.
Figure 10:
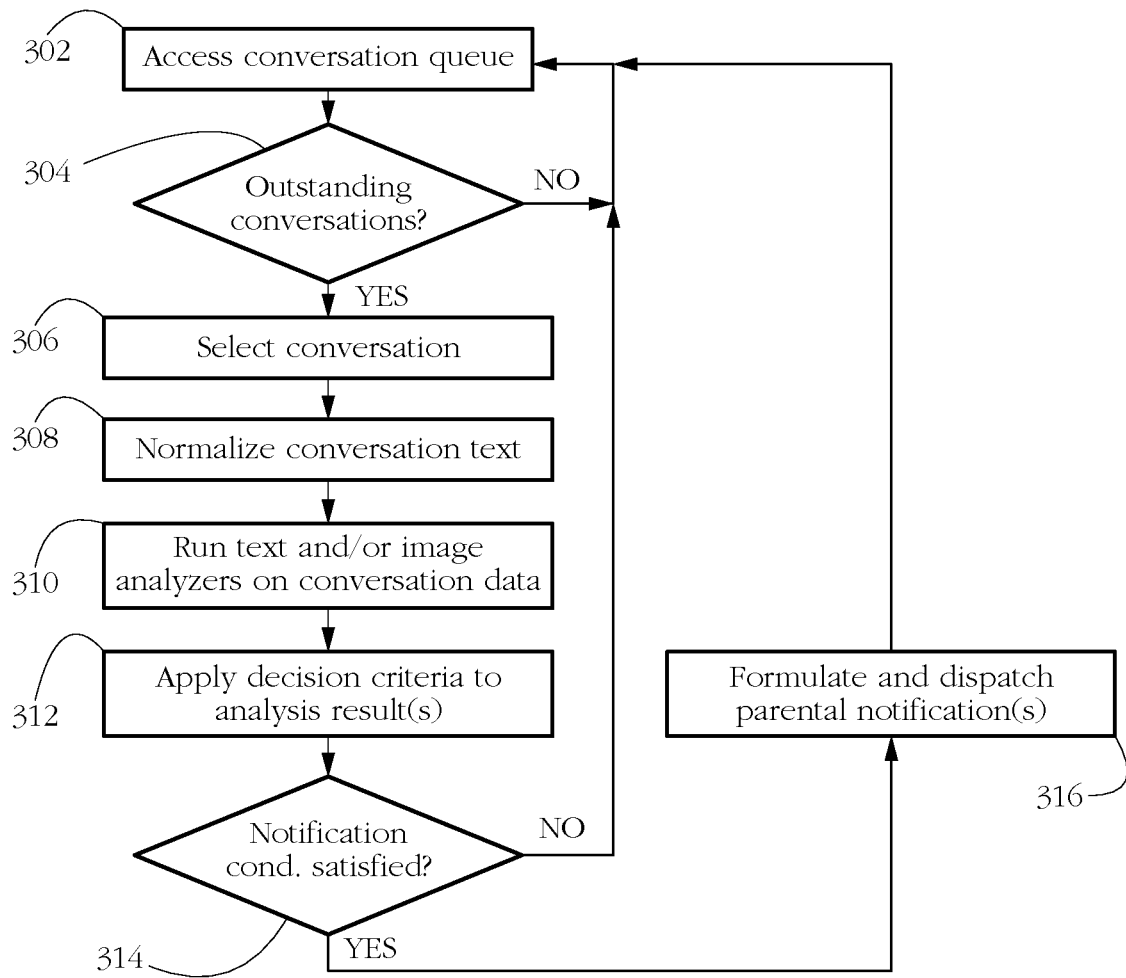
FIG. 10 shows an exemplary sequence of steps performed by the security server according to some embodiments of the present invention.

FIGS. 8-9 illustrate exemplary software components executing on security server 18, and an exemplary operation of such components, respectively, according to some embodiments of the present invention. FIG. 10 further details the operation of said components as an exemplary sequence of steps.

In some embodiments, conversation data is received from message aggregator 54 in the form of conversation indicator(s) 20. Each indicator 20 may represent a single conversation, which in turn may comprise multiple messages exchanged between the same interlocutors over a specified time period. In some embodiments, conversation indicators 20 accumulate in a queue, awaiting further processing. Such processing may comprise selecting a conversation and removing it from the queue (steps 302-204-306 in FIG. 10). The selected indicator 20 is then fed to a conversation analyzer 51, which analyzes a content of the respective conversation to determine a plurality of assessment indicators (e.g., numerical or Boolean scores, category labels, etc.) and output them to a decision unit 53. In a further step 312, decision unit 53 may aggregate analysis results received from conversation analyzer 51 and apply a set of decision criteria to determine whether a user of monitored device 10 is subject to an online threat such as bullying, sexual harassment, grooming, etc. In some embodiments, decision unit 53 communicates a unified risk assessment indicator 22 to a notification dispatcher 59. In a step 314, notification dispatcher may determine whether a notification condition is satisfied according to the received assessment indicator. When yes, dispatcher 59 may formulate and transmit parental notification 24 to reporting device 14. Some of the above steps will be further detailed below.

In some embodiments, conversation analyzer 51 comprises a set of text processors 56 configured to analyze a text content of a conversation, and/or a set of image processors 58 configured to analyze an image and/or video content of a conversation. Each processor 56-58 may analyze each conversation according to a distinct aspect of the respective conversation and/or according to a distinct algorithm. For instance, each processor 56-58 may determine whether a user is subject to a different type of threat (bullying, sexual harassment, grooming, etc.) In another example, there may be multiple processors detecting the same type of threat, but each processor may use a different criterion or algorithm, or may consider a different aspect of the analyzed conversation. For instance, some text processors may search the analyzed conversation for certain keywords, while others may employ a neural network to produce a score or a label characterizing the respective message or conversation, etc. Other exemplary conversation aspects include aggressiveness, friendliness, and sexual content, among others.

In some embodiments, a text content of a conversation is normalized in preparation for feeding to at least some of text processors 56 (step 308 in FIG. 10). Such normalization may include spellchecking, expanding acronyms, detecting and interpreting emojis, URLs, person and/or location names. Normalization may comprise looking up a dictionary of the respective natural language (e.g., English), augmented with slang items and various expressions/acronyms frequently used in instant messaging.

Figure 11:
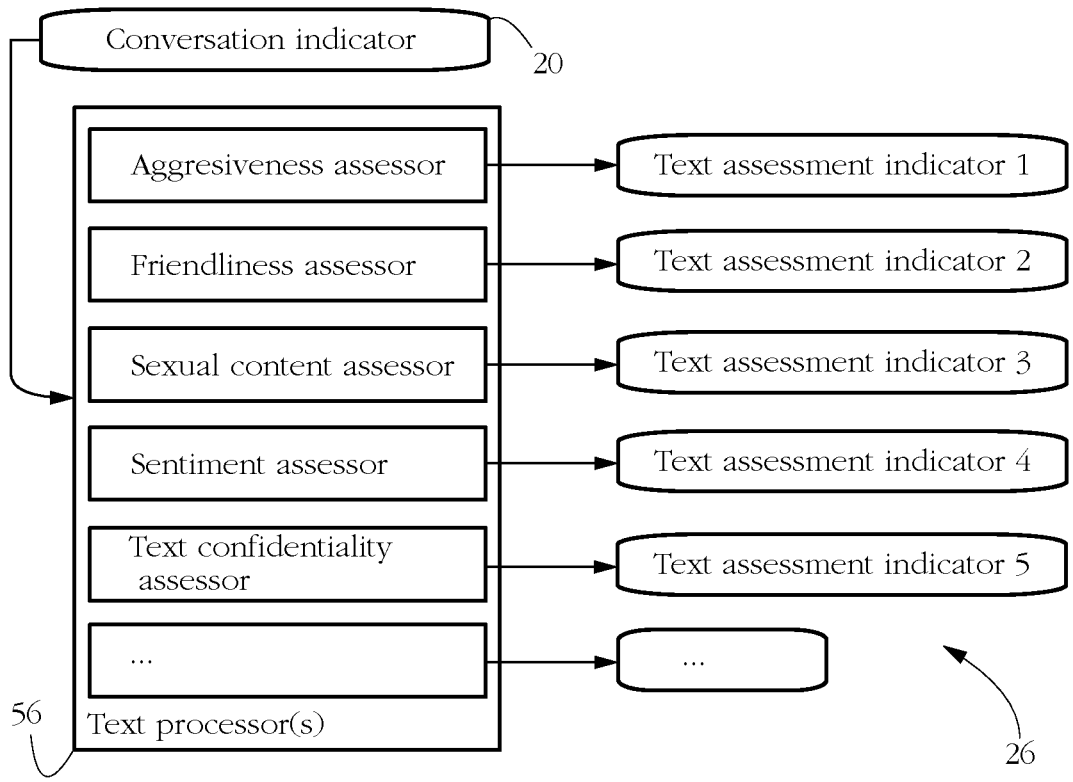
FIG. 11 illustrates a set of exemplary text processors according to some embodiments of the present invention.
Figure 12:
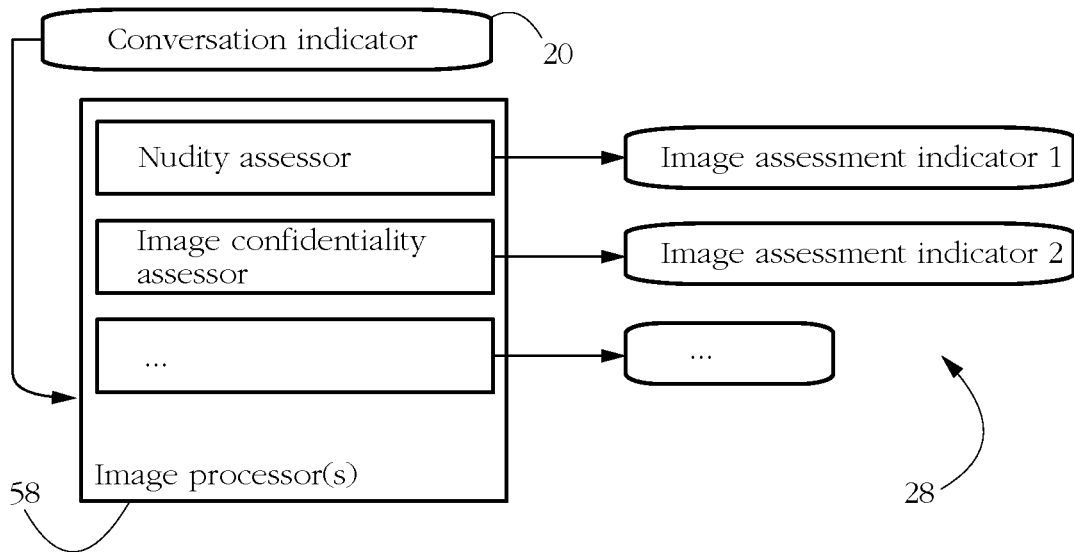
FIG. 12 shows a set of exemplary image processors according to some embodiments of the present invention.

Some exemplary text and image processors 56-58 are illustrated in FIGS. 11-12, respectively. Each text processor 56 may output a text assessment indicator 26. Similarly, image processors 58 may output a set of image assessment indicators 28. One exemplary text assessment indicator 26 includes a numerical score indicative of a likelihood that at least one interlocutor is the subject of an online threat (e.g., bullying) according to a text content of the respective conversation. An exemplary image assessment indicator 28 may indicate whether the current conversation comprises at least one image belonging to a particular category (e.g., a nude or partially nude picture, a photograph of a credit card, etc.)

Some embodiments of the present invention rely on the observation that due to the complexity of social interactions, which are especially emotionally charged in childhood and adolescence, a single algorithm/analysis protocol is unlikely to successfully detect threats such as bullying. For instance, children and teens often address each other using demeaning nicknames, insults, and derogatory language, even when they mean no harm. Such "posturing" is simply seen as cool or a fun thing to do. Therefore, a text analysis algorithm merely aimed at detecting insults and/or conflict-indicative language may wrongly classify a cocky exchange between close friends as a word fight or instance of bullying. To avoid such false positives, some embodiments employ multiple natural language processing algorithms to analyze various aspects of each conversation and extract a variety of assessment indicators. Some embodiments then increase the reliability of threat detection by aggregating information provided by multiple individual assessment indicators. Image assessment indicators may be combined with text assessment indicators. For instance, a nude picture may provide an additional clue to a suspicion of sexting, etc.

Exemplary text processors 56 illustrated in FIG. 11 include, among others, an aggressiveness assessor, a friendliness assessor, a sexual content assessor, a sentiment assessor, and a text confidentiality assessor. Each text processor 56 may output a set of scores, labels, etc. Such scores/labels may be determined for each individual message of the conversation, or may be determined for the respective conversation as a whole.

An exemplary aggressiveness assessor computes a score for each message of a conversation, the score indicative of a level of aggression indicated by the language of the respective message. The aggressiveness score may be expressed as a binary number (1/0, YES/NO), or as non-binary number which may take any value between pre-determined bounds. Aggressiveness assessors may employ methods such as detecting the presence of certain aggression-indicative keywords, or any other method known in the art. A preferred embodiment trains a recurrent neural network (RNN) using a vector representation of each word in a dictionary. Exemplary vector representations can be obtained using a version of a word-2-vec and/or Glove families of algorithms. Each message of a conversation may then be represented as a sequence of vectors. The architecture of the aggressiveness assessor may include, among others, a long short-term memory (LSTM) stacked on top of a gated recurrent unit (GRU) layer. Training may enforce particular rules, e.g., only insults formulated in the second person may be labeled as positive/aggressive. In one such example, the phrase "you are so stupid" may score higher for aggressiveness than "he is so stupid". The output of such a neural network may comprise a score/label determined for each individual message, or a score/label determined for the whole conversation.

The architecture of an exemplary sexual content assessor may be similar to the one described for the aggressiveness assessor. However, the sexual content assessor may be specifically trained to output a score indicating whether each conversation and/or message contains sexual language. Sometimes sexual and aggressive language co-exist in a conversation, so this is an example wherein having independent assessors for each aspect of a conversation may produce a more nuanced and possibly more accurate classification of the respective conversation. Some embodiments may be further trained to identify other text patterns which may not be sexually explicit, but may nevertheless indicate grooming or sexual predation. For instance, some embodiments may detect whether a message is asking for a meeting, for a personal address, etc. Some embodiments of the sexual content assessor may be trained to distinguish between multiple scenarios and/or categories of sexual content (e.g., grooming, sexting, etc.) In one such example, the sexual content assessor may output a vector of scores, each score corresponding to a distinct category/scenario and indicating a likelihood that the analyzed conversation falls within the respective category/scenario.

An exemplary friendliness assessor aims to detect phrases that display affection and a friendly attitude towards one or the other of the interlocutors. Since friends often tease each other using offensive language, a friendliness indicator/score may help distinguish true abuse from behaviors that could appear aggressive, but are in fact playful and benign. An exemplary friendliness assessor may employ a rule-based system to identify direct positive phrasing towards a conversation partner (e.g., "I like you") and/or indirect phrasing, wherein a current message is used to respond positively to a previous one (e.g., "do you like me?", "God, you ARE stupid. Sure I do. You're the best".) This is another example wherein text content analysis is correlated across multiple messages of the same conversation, as opposed to analyzing each message separately.

An exemplary sentiment assessor may employ any method known in the art to determine a numerical or categorical indicator of mood/sentiment of the respective conversation. An exemplary indicator may have positive values when the conversation is deemed happy/relaxed, and negative values when the conversation indicates stress, depression, anger, etc. The value of the respective assessment indicator may indicate an intensity of the respective sentiment. An exemplary sentiment assessor uses a Valence Aware Dictionary and Sentiment Reasoner (VADER) methodology, wherein each token of a message (e.g., each word or phrase) is labelled according to its semantic orientation as either positive or negative, and an aggregate score/label is computed by combining individual token labels. The aggregate score may be computed at the granularity of individual messages, or for the conversation as a whole. In some embodiments, an aggressive conversation wherein only one side is feeling bad/upset is a strong indication that bullying is under way. Such a situation may hence receive a relatively high aggregated bullying-indicative score for the respective conversation.

An exemplary text confidentiality assessor may determine whether a conversation communicates sensitive information which the respective user (e.g., child, employee) should not be sharing with others. Some examples of such information are credit card numbers, social security numbers, and home addresses, among others. One exemplary text confidentiality assessor may use character pattern matching (e.g., regular expressions) to identify data such as credit card numbers and addresses. Other embodiments may train a neural network to detect text patterns that look like credit card information, social security numbers, etc. A text confidentiality assessor may output a vector of scores, each score indicating whether the text of the current conversation contains a distinct category of confidential data. Such text confidentiality scores may be determined for the conversation as a whole.

In some embodiments, image processor 58 (see FIGS. 5 and 10) use a variety of methods/algorithms to detect various features of image and/or video data exchanged as part of a conversation. One exemplary image processor 58 comprises a nudity assessor configured to return a score indicative of a likelihood that an image contains nudity. In an alternative embodiment, the nudity assessor may return a plurality of scores, each score indicating a likelihood that the image shows a particular body part (e.g., face, breast, nipple, leg), and/or whether the respective image is likely to belong to a particular type of imagery (sexual activity, sunbathing, etc.). In some embodiments, the nudity assessor is further configured to return an indicator of whether each visible body part is naked or covered.

Figure 13:
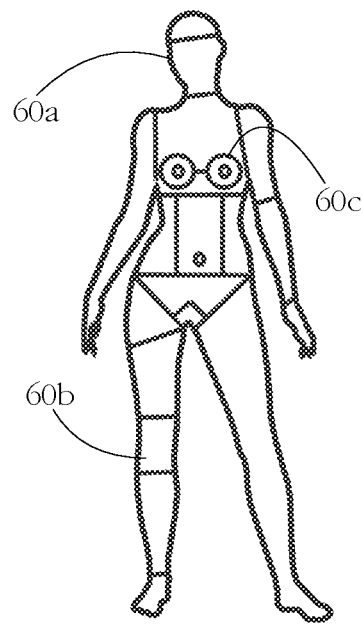
FIG. 13 illustrates exemplary body parts that an image processor is trained to detect in an image, according to some embodiments of the present invention.

FIG. 13 shows a few illustrative body parts 60a-c that an exemplary nudity assessor is trained to discover in an image file transmitted as part of a conversation according to some embodiments of the present invention. Each body part 60a-c comprises a part of a human body, such as a head, face, hair, chest, cleavage, breast, nipple, under breast, abdomen, navel, lower waist, crotch, genitals, anus, buttock, sacrum, lower back, middle back, shoulder blade, neck, nape, upper arm, lower arm, hand, thigh, upper leg, lower leg, knee, and foot, among others. Some such body parts may overlap. Some embodiments are further trained to determine whether a body part detected in an image belongs to a man or a woman.

In a preferred embodiment, the nudity assessor may comprise a set of interconnected artificial neural networks, for instance a stack of convolutional neural networks further feeding into a fully connected layer. The respective nudity assessor may receive the analyzed image as input and may be configured to output a set of scores and/or labels. The neural networks may be trained on a corpus of annotated images. Training a neural network may comprise iteratively adjusting a set of functional parameters (e.g., connection weights) of the respective neural network in an effort to reduce a mismatch between the actual output of the network and a desired output such as the one provided by annotation.

Another exemplary image processor 58 comprises an image confidentiality assessor configured to return a score indicative of a likelihood that the respective image contains confidential information. Examples of confidential image data include an image of a bank card, an image of an official identification document such as a driver's license, social security card or passport, an image of a car license plate, an image of a user's home/school, etc. Bank cards include credit and debit cards, among others.

In some embodiments, the image confidentiality assessor comprises a set of interconnected artificial neural networks (e.g., convolutional neural networks) trained to input an image and output a set of scores and/or labels indicative of a likelihood that the image falls within a specific category (for instance that the image shows a specific type of physical object, such as a bank card.) The respective neural networks may be trained on an annotated corpus containing images of various kinds of documents in various contexts, for instance bank cards issued by various banks and having various designs, passports and/or driver's licenses issued by various countries, etc.

Some embodiments detect the presence of an physical object in an image according to characteristic features of the respective physical object. For instance, to detect the presence of a bank card, an exemplary image confidentiality assessor may be trained to detect an image of a magnetic strip, an image of a handwritten signature located in the vicinity of a magnetic strip, an image of an embedded microchip, an image of 16 digits aligned and divided in groups of four (i.e., the card number), an image of the VISA® or MASTERCARD® logo, etc. In the case of a social security card, the image confidentiality assessor may be trained to determine whether the analyzed image comprises a logo of the Social Security Administration and/or a set of 11 digits aligned and divided into three groups (i.e., the social security number). Driver's licenses and passports may also be identified according to characteristic features, such as a photograph of a human head, and a specific placement of various data on the respective document.

In some embodiments, the image confidentiality assessor (e.g., neural network) may be trained to output a plurality of scores, each score indicative of a likelihood that the analyzed image shows a distinct feature of a bank card, social security card, etc. For instance, one score may indicate a likelihood that the image shows an embedded card microchip, another score may indicate a likelihood that the image show a VISA® logo, etc. Such individual scores may then be aggregated by decision unit 53, for instance using a weighted average or a decision algorithm.

Some embodiments of the image confidentiality assessor may be further trained to extract structured data from the analyzed images. For instance, in addition to determining that an image shows a credit card, some embodiments may determine a type of card (e.g., VISA®), an issuing bank, etc. Similarly, in addition to detecting an image of a driver's license, some embodiments may automatically determine a name of the driver, etc.

In some embodiments, decision unit 53 (FIG. 9) inputs individual assessment indicators 26-28 received from text and/or image processors 56-58, respectively, and outputs an aggregated risk assessment indicator 22 determined according to the individual risk assessment indicators. An exemplary aggregated risk assessment indicator 22 is determined for the conversation as a whole and comprises a set of scores wherein each score indicates a likelihood of a distinct type of threat or scenario (e.g., fighting, bullying, depression, sexual exposure, grooming, loss of confidential data, etc.). Aggregate indicators 22/scores may be computed using any method known in the art. One example comprises computing a weighted average of individual assessment indicators/scores. In another example, an aggregate score is determined according to a decision algorithm: if score x is YES and score y is below 0.4, then the aggregated score is 0.8.

An aggregate score for bullying may be determined according to the following observations. Bullying language typically occurs in scattered bursts, rather than being distributed uniformly throughout the conversation. There are typically multiple such bursts within an abusive conversation. In some embodiments, to qualify as bullying, aggressive language should be persistent within an individual burst (i.e., a single offensive message does not indicate bullying). More often than not, children are using offensive language without the intent to cause harm. Usually in this kind of interactions (i.e., non-bullying), there is evidence of friendly language, and the general tone of the conversation is rather positive or neutral. Finally, in many cases aggressive language and sexual language overlap.

Using the above observations, some embodiments scan each conversation with a fixed-length window and a fixed step (i.e., a pre-determined number of consecutive messages at a time). For each such conversation segment and each interlocutor, decision unit 53 may create a vector wherein each element represents a combined score determined for a distinct individual message of the respective conversation. Individual text assessment indicators may be combined as follows:

$$S_i = A_i \cdot F_i \cdot X_i, \quad [1]$$

wherein $S_i$ denotes a message-specific combined score, $A_i$ and $F_i$ denote an aggressiveness and a friendliness score of the respective message, and $X_i$ denotes a sexual content (e.g., sexting) score of the respective message. Some of the following situations may occur, for instance: if a message is only aggressive, the respective combined score $S_i$ is 1; if the message is detected to be both aggressive and sexual, the combined score $S_i$ is 0 (sexual language cancels aggressive language); if the message is detected to be both aggressive and friendly, the combined score $S_i$ is also 0 (friendly language cancels aggressive language).

A further step may compute an aggressiveness concentration score for the current conversation segment, for instance using the formula:

$$C = \frac{1}{N} \sum_i \left( S_i + \frac{s_i}{d_i} \right), \quad [2]$$

wherein N denotes the total number of messages within the respective conversation segment, $S_i$ is the combined score of each message of the respective segment, and $d_i$ denotes a distance (e.g., count of messages) between the current message and the closest aggressive message (e.g., combined score $S_i=1$). Formula [2] yields a relatively higher value for conversation segments that have closely-spaced aggressive messages compared to other conversation segments. In a subsequent step, the value of C may be compared to a pre-determined threshold (e.g., 0.5). A value in excess of the threshold indicates an aggressive user for the respective segment of conversation. The calculation may be performed separately for each interlocutor and each segment of the conversation. Some embodiments may then determine a type of relationship between the interlocutors, for instance: normal—none of the interlocutors is excessively aggressive; bullying—one of the interlocutors is substantially more aggressive than the other; fight—both interlocutors are substantially and equally aggressive. For a verdict of bullying, some embodiments may further determine whether the bully is the user of monitored device 10 or not, to enable notification dispatcher 59 to include such information in parental notification 24.

In some embodiments, conversation-specific risk assessment indicators/scores 22 are compared with a set of pre-determined thresholds specific to each type of threat. A score exceeding the respective threshold may indicate a presence of the respective threat/scenario. When a score exceeds the respective threshold, some embodiments of notification dispatcher 59 may formulate and send parental notification 24 to reporting device 14.

Several exemplary conversation snippets and their associated scoring are shown below.

Example 1: Bullying

| User | Message | Aggressiveness | Friendliness | Sexting |
|---|---|---|---|---|
| A | hey faggot | 1 | 0 | 0 |
| B | stop calling me that | 0 | 0 | 0 |
| A | or what, are u going to run to your fat mom? | 1 | 0 | 0 |
| A | you lame ass fag | 1 | 0 | 0 |
| B | stop it | 0 | 0 | 0 |

This example is characterized by a substantial imbalance of aggressiveness: user A is abusing user B, and B is not responding in kind. An aggressiveness concentration indicator determined according to formula [2] yields 2.0 for user A and 0.0 for user B. Some embodiments compare the difference in aggressiveness between the two users to a threshold (e.g., 0.5), and since the difference exceeds the threshold, determine that user A is substantially more aggressive than B. Therefore, A is bullying B.

Example 2: Non-Bullying

| User | Message | Aggressiveness | Friendliness | Sexting |
|---|---|---|---|---|
| A | you being a bitch right now | 1 | 0 | 0 |
| A | you know I like you, but you're overreacting | 0 | 1 | 0 |
| B | I'm going to kill you for that | 1 | 0 | 0 |
| A | hey babe, it was nothing | 0 | 1 | 0 |
| A | I love you | 0 | 1 | 0 |
| B | yea I guess you're right | 0 | 0 | 0 |
| B | I love you too | 0 | 1 | 0 |

In this example aggressive language coexists with friendly language. However, the friendliness score exceeds the aggressiveness score, and formula [2] yields sub-zero values for both interlocutors. Therefore, the conversation is not classified as bullying.

Example 3: Sexting

| User | Message | Aggressiveness | Friendliness | Sexting |
|---|---|---|---|---|
| A | maybe you can blow me | 1 | 0 | 1 |
| A | you sexy mofo | 1 | 0 | 1 |
| B | I'm getting horny already | 0 | 0 | 1 |
| B | can you come over? | 0 | 1 | 0 |

In this example, aggressive language coexists with sexting, and therefore the aggressiveness score is cancelled out. The conversation does not qualify as bullying, even though only one side of the conversation is aggressive.

Thresholds and/or other scoring parameters (e.g., weights given to specific scores) may be tailored and/or adjusted per monitored device, user, and/or category of users, for instance according to a subscription type or service-level agreement, thus providing a degree of vigilance that is customizable. Some embodiments rely on the observation that what is considered 'acceptable behavior' may vary widely between countries, cultures, and even individuals. For instance, in some countries and cultures, women are required to cover their hair in public, so an image of a woman with an uncovered head may be seen as unacceptably revealing, whereas in other cultures it is completely normal. The same is true for other body parts, such as an ankle or an upper arm. Even in Western societies, conservative families are stricter on the behavior of children and teens than more liberal ones. For instance, a short skirt may be considered normal for some, and too revealing for others. Therefore, in some embodiments of the present invention, thresholds and/or score aggregation strategies may be adjusted according to personal choice, cultural criteria and/or according to a geographical location of devices 10 and/or 14. In one such example, when installing and/or configuring software on monitored device 10 and/or reporting device 14, a user may be shown a configuration interface and invited to customize a set of criteria for receiving parental notifications. For instance, the user may be invited to select an overall level of vigilance (e.g., on a sliding scale from 0 to 10), and/or to select a subset of scenarios that should trigger notifications from a broader set of exemplary scenarios. In some embodiments, the software may automatically choose a set of parameter values (e.g., notification scenarios, vigilance level, etc.) according to a country and/or culture of the respective user. Such automatic selection may include, for instance, automatically detecting a geolocation of reporting device 14 and/or monitored device 10 and looking up a database of location-specific settings. Such settings may then be automatically translated into specific threshold values and/or other score aggregation parameters.

In determining aggregated assessment indicator 22, decision unit 53 may combine text assessment indicators with image assessment indicators determined for the same conversation. In one such example, output of the sexual content assessor (text) may be combined with output of the nudity assessor (image) to generate an aggregate sexual content score. When the text of a conversation includes sexual content, the respective content may merely represent vulgar language used in a word fight. The score given to the respective conversation by the sexual content assessor may therefore not be high enough to trigger classifying the conversation into a sexual threat category. However, when the respective conversation also includes a revealing image, the score given by the nudity assessor may be combined with the score returned by the text processor, to produce an aggregate score that exceeds the respective threshold. Scores may be combined for instance as a weighted average, wherein each individual weight may reflect a relevance of the respective score to a particular threat/situation. In the example of sexual content, the score produced by the image processor may receive a higher weight than the score produced by the text processor.

In preparation for sending parental notification 24, dispatcher 59 may identify the appropriate receiver of the respective notification, i.e., reporting device 14. In some embodiments, parental control services are provided in accordance with a subscription and/or a service level agreement (SLA). To provide such services, some embodiments maintain a database of subscription or account entries, wherein each entry may be attached to a reporting device 14, so that notifications generated in relation to the respective subscription/account are delivered to the respective reporting device. Reporting device 14 may be identified for instance according to a network address, or according to a unique identifier generated by a software agent executing on device 14 and configured to collaborate with server 18 in delivering notifications. The respective subscription/account entry may further indicate a set of monitored devices 10 as targets for collecting and analyzing conversation data. A single subscription/account may service multiple to monitored devices 10. The subscription/account entry may further indicate a monitored user of device 10, for instance as a username, alias and/or avatar used by the monitored user (e.g., minor) inside messaging application 48. The association between monitored devices 10, users, and reporting device 14 enables dispatcher 59 to selectively identify reporting device 14 according to an identity of a monitored device 10 and/or according to an identity of a user of device 10.

Delivering notification 24 may proceed according to any method known in the art, for instance by pushing notification 24 to a software agent/application executing on reporting device 14, including notification 24 an email or SMS message, etc.

Parental notification 24 may comprise a notification message formulated in a natural language, e.g. English. Notification messages may include an indicator of a detected incident/scenario/threat, e.g., child is bullied, child has sent confidential information, etc. To preserve the monitored user's privacy, some embodiments do not reveal actual message contents to parents/guardians/administrators. Some embodiments further include parenting advice/suggestions of how to address the respective detected scenario or threat, and/or a set of psychology resources (hyperlinks, literature references, etc.) relevant to the respective detected incident/threat. The notifications may be formulated as much as possible to not alarm the parent/guardian, and to not reveal the identity of the parties involved in the respective conversations. When bullying is detected, the notification message may indicate whether the user of monitored device 10 is the perpetrator or the receiver of the abuse. Some examples of notification messages are given below.

Cyberbullying & Anti-Predator

Examples of notifications in response to scenarios/threats detected using text analysis:

Child is in a one-to-one verbal fight: "Jenny is involved in a verbal dispute in a chat named [conversation name]. When talking about online behavior, remind your child that aggression is never 'just a joke.' Even if it seems like everybody is doing it, it is not ok.

Child is bullied one to one: "Jenny is cyberbullied in a chat named [conversation name]. Listen to your child. Find out exactly what happened, how she felt and why. Here are a few pointers on how to start a conversation: [link]"

Child is in a group chat and is the only one being aggressive: "Jenny is involved in a verbal dispute in a group chat named [conversation name]. Her behavior seems aggressive toward interlocutors. When talking about online behavior, remind your child aggression is never 'just a joke.' Even if it seems like everybody is doing it, it's not ok."

Child is in a group verbal fight but is not aggressive: "Jenny is involved in a verbal dispute in a group chat named [conversation name]. Her behavior does not seem aggressive toward interlocutors. When talking about online behavior, remind your child aggression is never 'just a joke.' Even if it seems like everybody is doing it, it's not ok."

Child Security, Sex Predation and Grooming

Examples of notifications in response to scenarios/threats detected using text analysis:

Child receives a personal address: "Jenny received a personal address in a conversation named [conversation name]. Remain calm and talk face to face with your child about the importance of privacy. Here are a few pointers on how to start a conversation: [link]"

Child is asked for a face-to-face meeting: "Jenny received a request for a meeting in a chat named [conversation name]. Talk calmly with your child about the meeting request, preferably in person."

Child accepts a face-to-face meeting: "Jenny accepted a meeting in a conversation named [conversation name] at 7 pm. It doesn't necessarily mean something is wrong. Maybe it's just good that you know."

Child is asked for pictures: "Jenny received a request for photos in a chat named [conversation name]. Remind your kids that sharing everything makes them vulnerable. Both online and offline, some things should remain private."

Child has a new contact in Social Media: "Jenny started talking online with a new contact in a chat named [conversation name]. Keep a good balance. A new contact doesn't necessarily mean trouble, nor that should you interrogate your child. Nevertheless, you might want to check out the new contact's profile and pay attention to any changes in your child's behavior."

Examples of notifications in response to scenarios/threats detected using image or combined text and image analysis:

Child receives a picture that is too revealing. "Jenny received a photo containing nudity in a chat named [conversation name]. If your child has been sent a sexual image or video, advise him/her to delete it immediately, and not to share it with anyone. Have a conversation about this later on."

Child sends a picture that is too revealing: "Jenny sent a picture containing nudity in a chat named [conversation name]. Keep calm and start a conversation with your child by asking 'If you got into a fight with this person, would you like them to have this photo of you?'.

Child has a revealing picture stored on her device: "Inappropriate media content detected on Jenny's handheld device. If your child has been sent a sexual image or video, advise him/her to delete it immediately, and not to share it with anyone. Have a conversation about this later on."

Confidentiality, Identity Theft, and Family Security

Examples of notifications in response to events/threats detected using text analysis:

Child is asked for her personal address: "Someone asked Jenny for a personal address in a chat named [conversation name]. Remind your child that your address should only be shared, with your consent, with certain people."

Child sends her personal address: "Jenny sent a personal address in a conversation named [conversation name]. Remain calm and talk face to face with your child about the importance of privacy."

Child is asked for credit card numbers: "Jenny was asked for a credit card number in a chat named [conversation name]. Calmly but firmly advise your child not to disclose such information. Discuss the consequences in further detail, face to face."

Child is asked for Social Security Number: "Jenny was asked for a social security number in a chat named [conversation name]. Calmly but firmly advise your child not to disclose such information. Discuss the consequences in further detail, face to face."

Child sends a credit card number in a conversation: "Jenny sent a credit card number in a conversation named [conversation name]. Remain calm and talk face to face with your child about the risks of giving away financial information."

Child sends a social security number in a conversation: "Jenny sent a social security number in a conversation named [conversation name]. Remain calm and talk face to face with your child about the risks of giving away private information".

Examples of notifications in response to events/threats detected using image or combined image and text analysis:

Child sends a photo of a credit card: "Jenny sent a picture of a credit card in a conversation named [conversation_name]. It appears to be a Mastercard issued by Chase. The details of this credit card are now online and in the possession of another person. You should secure the respective card following the bank's procedure. Afterwards, have a calm, yet firm conversation about this with your child."

Child sends a photo of a social security card: "Jenny sent a picture of a social security card in a conversation named [conversation_name]. The social security number is now in the possession of another person. Various confidential data is attached to your social security number. Here are a few steps you can take to check whether the gained information is being used for malicious purposes such as identity theft [link]. Have a calm, yet firm conversation about this with your child."

Child sends a photo of an identity document: "Jenny sent a picture of an identity document in a conversation named [conversation_name]. The document appears to be an American passport. Have a calm, yet firm conversation with your child about identity theft and/or the risks of giving away personal information online."

Child has a photo stored on her device, the photo showing a credit card. "A picture of a credit card has been detected on Jenny's handheld device. Remain calm and talk face to face with your child about the risks of giving away financial information."

Child has a photo stored on her device, the photo showing an identity card: "A picture of an identity card has been detected on Jenny's handheld device. Remain calm and talk face to face with your child about the risks of giving away personal information."

Although the above description relates to a configuration as described in FIGS. 3 and 8, a skilled artisan will understand that alternative embodiments may use another distribution of software components. For instance, in some embodiments, conversation analyzer 51 and decision unit 53 may execute on monitored device 10 instead of on server 18 as illustrated in FIG. 8. In such configurations, a typical data exchange between device 10 and server 18 is illustrated in FIG. 2-B. Such configurations may have the advantage that all message content stays on monitored device 10, thus ensuring the privacy of the respective user. A disadvantage is that operations of conversation analyzer 51 and/or decision unit 53 are typically computationally expensive, and may put an unacceptable burden on a relatively modest device such as a mobile telephone or tablet computer. Another potential disadvantage of carrying out text and/or image processing at monitored device 10 is the necessity of distributing software updates to all such devices. In contrast, when conversation analysis is carried out at security server 18, a single machine may process conversation data received from multiple (possibly thousands) of monitored devices.

In yet another alternative embodiment, message aggregator 54 may execute on security server 18 instead of on monitored device 10 as illustrated in FIG. 4. In such configurations, aggregator 54 may receive message indicators from a plurality of devices. Such configurations may allow aggregating conversations across multiple devices, for instance when a user starts a FACEBOOK® messaging exchange on a smartphone, but continues it later from a personal computer.

Figure 14:
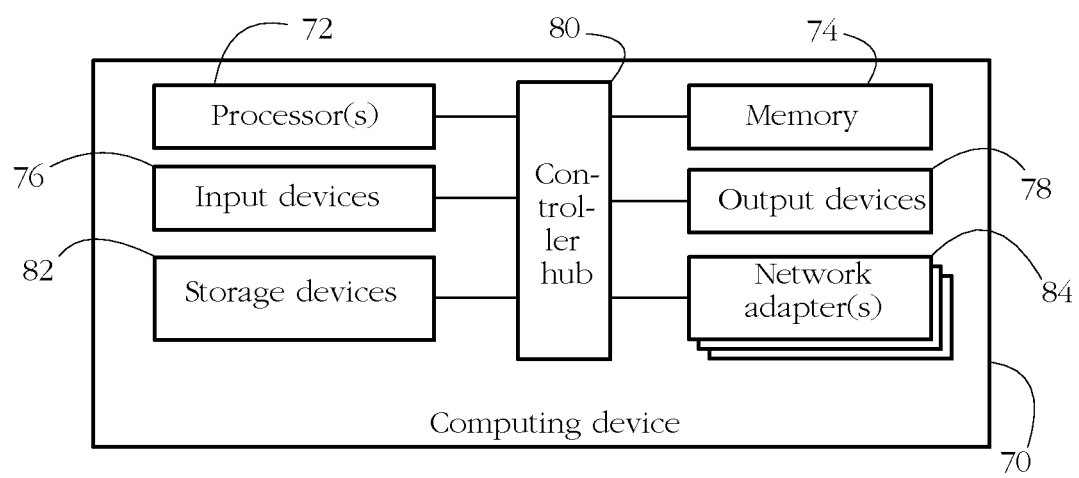
FIG. 14 shows an exemplary hardware configuration of a computation device configured to carry out parental control operations according to some embodiments of the present invention.

FIG. 14 shows an exemplary hardware configuration of a computing device 70 programmed to execute some of the methods described herein. Device 70 may represent any of monitored device 10, security server 18, and reporting device 14 in FIG. 1. The illustrated configuration is that of a personal computer; other computing devices such as mobile telephones, tablet computers, and wearables may have slightly different hardware. Processor(s) 72 comprise a physical device (e.g. microprocessor, multi-core integrated circuit formed on a semiconductor substrate) configured to execute computational and/or logical operations with a set of signals and/or data. Such signals or data may be encoded and delivered to processor(s) 72 in the form of processor instructions, e.g., machine code. Processor(s) 72 may include a central processing unit (CPU) and/or an array of graphics processing units (GPU.)

Memory unit 74 may comprise volatile computer-readable media (e.g. dynamic random-access memory—DRAM) storing data/signals/instruction encodings accessed or generated by processor(s) 72 in the course of carrying out operations. Input devices 76 may include computer keyboards, mice, and microphones, among others, including the respective hardware interfaces and/or adapters allowing a user to introduce data and/or instructions into computing device 70. Output devices 78 may include display devices such as monitors and speakers among others, as well as hardware interfaces/adapters such as graphic cards, enabling computing device 70 to communicate data to a user. In some embodiments, input and output devices 76-78 share a common piece of hardware (e.g., a touch screen.) Storage devices 82 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 84 enable computing device 70 to connect to an electronic communication network (e.g., network 15 in FIG. 1) and/or to other devices/computer systems.

Controller hub 80 generically represents the plurality of system, peripheral, and/or chipset buses, and/or all other circuitry enabling the communication between processor(s) 22 and the rest of the hardware components of device 70. For instance, controller hub 80 may comprise a memory controller, an input/output (I/O) controller, and an interrupt controller. Depending on hardware manufacturer, some such controllers may be incorporated into a single integrated circuit, and/or may be integrated with processor(s) 72. In another example, controller hub 80 may comprise a northbridge connecting processor 72 to memory 74, and/or a southbridge connecting processor 72 to devices 76, 78, 82, and 84.

It will also be apparent to one of ordinary skill in the art that aspects of the invention, as described above, may be implemented in various forms of software, firmware, and hardware, or a combination thereof. For example, certain portions of the invention may be described as specialized hardware logic that performs one or more functions. This specialized logic may include an application specific integrated circuit (ASIC) or a field programmable gate array (FPGA). The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

The exemplary systems and methods described herein allow protecting vulnerable Internet users (e.g., minors) against online threats such as cyberbullying, online abuse, grooming, sexual harassment or exploitation, and theft of confidential information, among others. Such systems and methods typically fall in the category of parental control. However, some systems and methods described herein may extend beyond classical parental control applications, for instance to detecting online abuse such as racist, sexist, or homophobic attacks perpetrated against adults using online messaging services.

In some embodiments, electronic messages exchanged by a monitored user are automatically and surreptitiously harvested from an electronic device (e.g., smartphone, tablet computer) the respective user is using to communicate. Messages are then selectively aggregated into conversations comprised of messages exchanged between the same interlocutors. Conversation data is then analyzed according to various criteria. When analysis concludes that the monitored user is subject to an online threat, some embodiments transmit a notification message to a supervisor of the respective user (e.g., parent, teacher, manager, etc.).

Some embodiments rely on the observation that the social dynamics involved in dangerous scenarios such as bullying are relatively complex. Therefore, in determining whether a user is subject to such an online threat, some embodiments aggregate information from multiple messages and/or multiple aspects of a conversation. For instance, some embodiments combine a result of analyzing a text of a conversation with a result of analyzing an image transmitted as part of the respective conversation. In turn, the analysis of the text part may also be multifaceted: some embodiments combine evaluations of an aggressiveness, friendliness, and sexual content of a conversation.

Other exemplary embodiments combine image analysis with text analysis to determine whether a monitored user is engaging in risky behavior of disclosing confidential information such as credit card data and social security numbers, among others. In one such example, images harvested from electronic messages are analyzed to determine whether they comprise a photograph of a bank card, social security card, driver's license, etc. Discovery of such an image may trigger a parental notification.

It will be clear to one skilled in the art that the above embodiments may be altered in many ways without departing from the scope of the invention. Accordingly, the scope of the invention should be determined by the following claims and their legal equivalents.

What is claimed is:

1. A parental control method comprising employing at least one hardware processor of a computer system to:
analyze an image transmitted as part of an electronic conversation between a minor and another party to determine whether the image shows a physical item and to identify a type of the physical item, wherein analyzing the image comprises employing a neural network to determine a plurality of scores, wherein the neural network is trained to identify distinct visual features of the physical item, wherein each score of the plurality of scores indicates whether the image shows a distinct visual feature of the physical item, wherein types of physical items identifiable by the neural network include a bank card, a social security card, and an identity document; and
in response, when the image shows the physical item, transmit a parental notification to a parental reporting device identified from a plurality of devices according to the minor, the parental notification indicating that the minor has disclosed confidential information and indicating the type of the physical item.

2. The method of claim 1, wherein determining whether the image shows the physical item comprises determining a likelihood that the image shows a bank card magnetic stripe.

3. The method of claim 1, wherein determining whether the image shows the physical item comprises determining a likelihood that the image shows an embedded bank card microchip.

4. The method of claim 1, wherein determining whether the image shows the physical item comprises determining a likelihood that the image shows a handwritten signature.

5. The method of claim 1, wherein determining whether the image shows the physical item comprises determining a likelihood that the image shows a logo of a credit card company.

6. The method of claim 1, wherein determining whether the image shows the item comprises determining a likelihood that the image shows a bank card number.

7. The method of claim 1, wherein the parental notification further includes a description of a risk associated with the disclosure of confidential information, and advice on mitigating the risk, the advice being determined according to the type of physical item.

8. A computer system comprising at least one hardware processor configured to execute an image processor and a parental notification dispatcher, wherein:

the image processor is configured to analyze an image transmitted as part of an electronic conversation between a minor and another party to determine whether the image shows a physical item and to identify a type of the physical item, wherein analyzing the image comprises employing a neural network to determine a plurality of scores, wherein the neural network is trained to identify distinct visual features of the physical item, wherein each score of the plurality of scores indicates whether the image shows a distinct visual feature of the physical item, wherein types of physical items identifiable by the neural network include a bank card, a social security card, and an identity document; and the parental notification dispatcher is configured, in response to the image processor determining that the image shows the physical item, to transmit a parental notification to a parental reporting device identified from a plurality of devices according to the minor, the parental notification indicating that the minor has disclosed confidential information and indicating the type of the physical item.

9. The computer system of claim 8, wherein determining whether the image shows the physical item comprises determining a likelihood that the image shows a bank card magnetic stripe.

10. The computer system of claim 8, wherein determining whether the image shows the physical item comprises determining a likelihood that the image shows an embedded bank card microchip.

11. The computer system of claim 8, wherein determining whether the image shows the physical item comprises determining a likelihood that the image shows a handwritten signature.

12. The computer system of claim 8, wherein determining whether the image shows the physical item comprises determining a likelihood that the image shows a logo of a credit card company.

13. The computer system of claim 8, wherein determining whether the image shows the physical item comprises determining a likelihood that the image shows a bank card number.

14. The computer system of claim 8, wherein the parental notification further includes a description of a risk associated with the disclosure of confidential information, and advice on mitigating the risk, the advice being determined according to the type of physical item.

15. A non-transitory computer-readable medium storing instructions which, when executed by at least one hardware processor of a computer system, cause the computer system to form an image processor and a parental control notification dispatcher, wherein:

the image processor is configured to analyze an image transmitted as part of an electronic conversation between a minor and another party to determine whether the image shows a physical item and to identify a type of the physical item, wherein analyzing the image comprises employing a neural network to determine a plurality of scores, wherein the neural network is trained to identify distinct visual features of the physical item, wherein each score of the plurality of scores indicates whether the image shows a distinct visual feature of the physical item, wherein types of physical items identifiable by the neural network include a bank card, a social security card, and an identity document; and the parental notification dispatcher is configured, in response to the image processor determining that the image shows the physical item, to transmit a parental notification to a parental reporting device identified from a plurality of devices according to the minor, the parental notification indicating that the minor has disclosed confidential information and indicating the type of the physical item.

* * * * *